United States Patent [19]
Wood et al.

[11] Patent Number: 4,718,291
[45] Date of Patent: Jan. 12, 1988

[54] DEVICES FOR CONVERTING ROTARY MOVEMENT INTO LINEAR MOVEMENT

[75] Inventors: Ronald A. E. Wood; Edward Godson, both of Nottingham; Harold E. Flory, Kent, all of England

[73] Assignee: RHP Group PLC, England

[21] Appl. No.: 497,979

[22] Filed: May 25, 1983

[30] Foreign Application Priority Data

May 28, 1982 [GB] United Kingdom ............... 8215676

[51] Int. Cl.⁴ .................... F16H 27/02; F16H 29/02; F16H 29/20
[52] U.S. Cl. ................................. 74/89.15; 74/216.3
[58] Field of Search ................. 74/25, 89, 89.15, 459, 74/216.3

[56] References Cited

U.S. PATENT DOCUMENTS

| | | | |
|---|---|---|---|
| 590,929 | 9/1897 | Youngken | 74/25 |
| 2,350,538 | 6/1944 | Selnes | 74/459 |
| 2,756,609 | 7/1956 | Hogan et al. | 74/459 |
| 2,946,235 | 7/1960 | Musser | 74/459 X |
| 2,987,268 | 6/1961 | Haugwitz | 74/25 |
| 3,046,801 | 7/1962 | Pravel | 74/25 |
| 3,081,639 | 3/1963 | Hauptman | 74/25 |
| 3,425,284 | 2/1969 | Shelton | 74/25 |
| 3,589,202 | 6/1971 | Stanley | 74/25 |
| 3,777,578 | 12/1973 | Swanberg | 74/89 |
| 3,903,748 | 9/1975 | Krogsrud | 74/25 |
| 3,958,678 | 5/1976 | Jeter | 192/44 |
| 4,008,929 | 2/1977 | Olrik | 308/176 |
| 4,034,833 | 7/1977 | Jeter | 192/45 |
| 4,141,255 | 2/1979 | Nilsson | 74/25 |
| 4,173,907 | 11/1979 | Lundgren | 74/459 |
| 4,203,328 | 5/1980 | DeBoynton | 74/25 |
| 4,224,831 | 9/1980 | Nilsson | 74/89 |
| 4,366,723 | 1/1983 | Wilke et al. | 74/424.8 R |

FOREIGN PATENT DOCUMENTS

| | | | |
|---|---|---|---|
| 1116009 | 10/1961 | Fed. Rep. of Germany | 74/25 |
| 2709006 | 7/1978 | Fed. Rep. of Germany | 74/25 |
| 57-40153 | 3/1982 | Japan | 74/25 |
| 0561374 | 4/1975 | Switzerland | 74/25 |

OTHER PUBLICATIONS

British Standard Glossary, 1984, 3 pages.
Torrington Company, "One Way Clutches", 17 pages, 12/17/80.

Primary Examiner—Dirk Wright
Attorney, Agent, or Firm—Sughrue, Mion, Zinn, Macpeak and Seas

[57] ABSTRACT

A device is composed of relatively rotatable cylindrical components one of which has a groove forming a raceway or track of part-helical form containing a set of balls in contact with a plain surface of the other component. The raceway wedges with the balls to resist direct axial motion between the components. Rotation of one component causes the balls to move around the raceway and be guided from the end to the start thereof under sufficient traction to cause linear motion of the other component.

22 Claims, 43 Drawing Figures

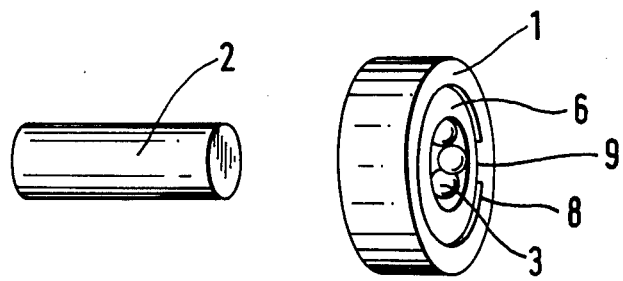
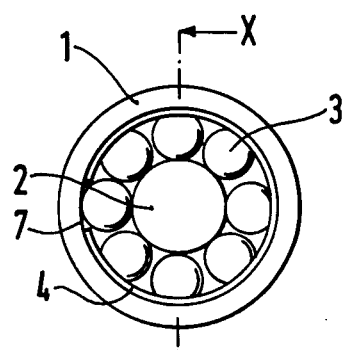
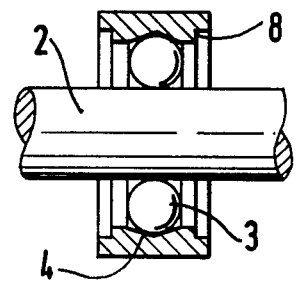
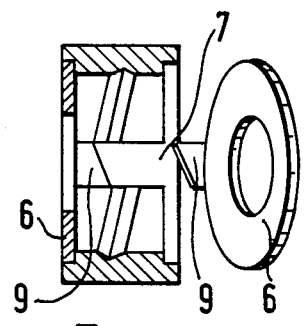

COMBINATIONS OF SIMPLE ROTATIONAL AND LINEAR MOVEMENTS

— First component has linear movent
Second component rotated

— First component is rotated and has linear movement
Second component fixed

— First component fixed
Second component is rotated and has linear movement

— First component is rotated
Second component has linear movement

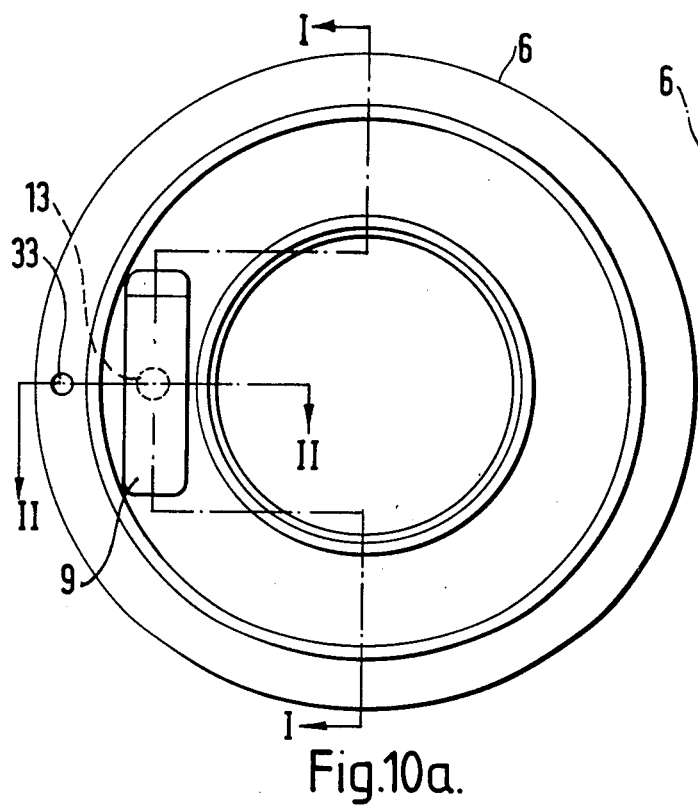
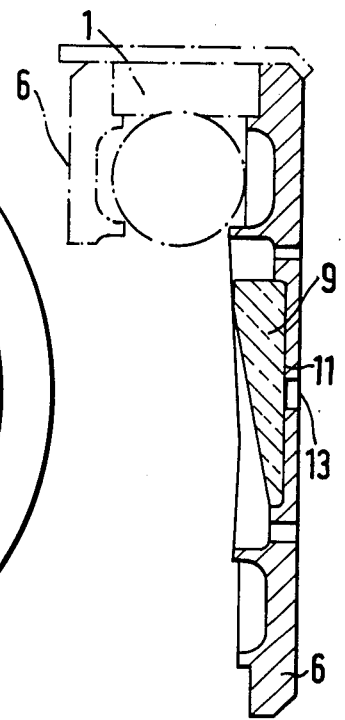
Fig.10a. Fig.10b.
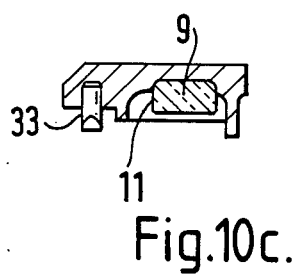
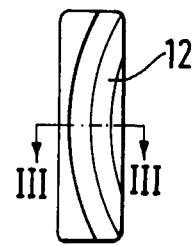
Fig.10c. Fig.11a.
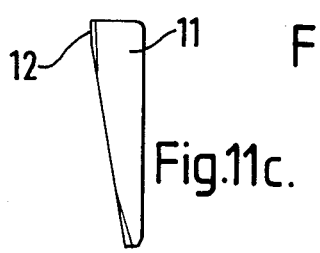
Fig.11b Fig.11c.

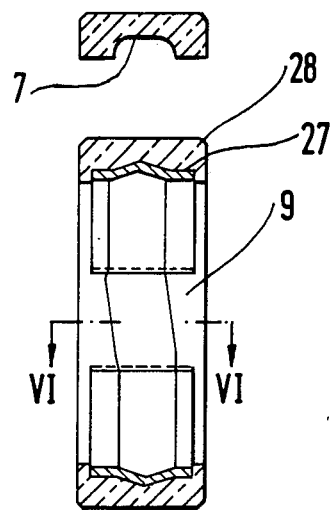
Fig.18c.
Fig.18b.
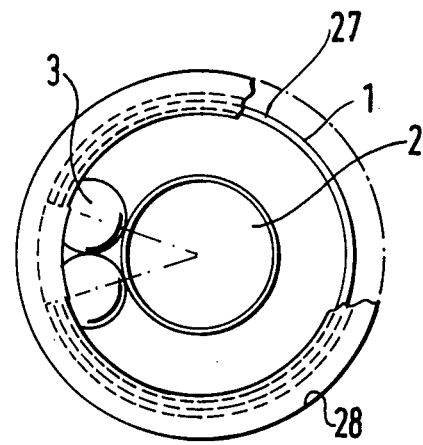
Fig.18a.
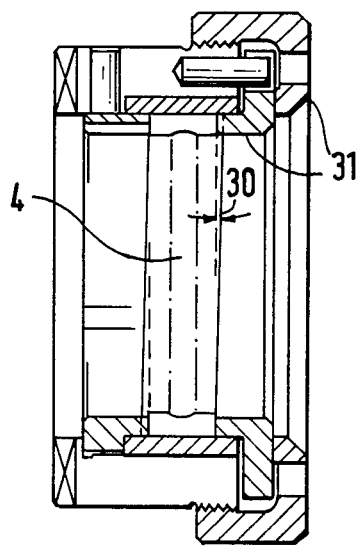
Fig.19a.
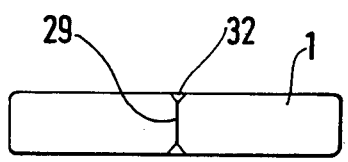
Fig.19.c.
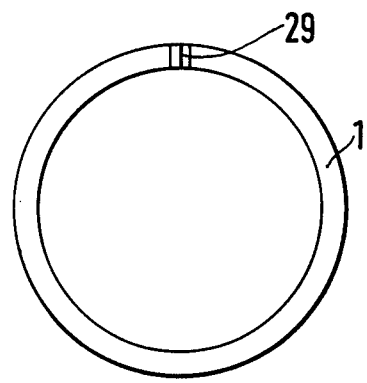
Fig.19b.

DEVICES FOR CONVERTING ROTARY MOVEMENT INTO LINEAR MOVEMENT

BACKGROUND OF THE INVENTION

The present invention relates to devices for converting rotary movement into linear movement.

Such devices are well known per se and a simple example of a known device is a screw-threaded spindle mating with a nut runner embodied as a wheel or knob for example. This simple device has a high frictional coefficient between the components which is disadvantageous in many applications. Re-circulating balls can be incorporated in the threads to provide a ball-screw race with improved characteristics. Ball-screw mechanisms of this type function well but are costly to manufacture.

A general object of the present invention is to provide an improved device for converting rotary movement into linear movement.

SUMMARY OF THE INVENTION

According to the invention such a device comprises first and second components rotatable about a common axis, the components having confronting surfaces one of which is substantially plain while the other of which is provided with a raceway or a track of at least part helical form and rolling elements in mutual contact with the confronting surfaces and guided for progressive continuous rolling movement along the track in a manner such that direct relative linear motion between the components parallel to the common axis is resisted in at least one direction while relative combined rotary and linear movements can occur in response to rotary drive imparted to one of the components.

In contrast to known devices, only one of the components has a track equivalent to a partial thread; the other component has a confronting surface which can be entirely smooth. Hence the device can be thought of as a "threadless screw" ball nut. One component can take the form of a ring which may have the track on its inner periphery while the other component may take the form of a plain shaft, tube or spindle. The rolling elements, which may be balls, have an epicyclic relationship with the driven component of the device. The component which has the track or raceway may have several independent tracks each containing a set of balls or several components, each with its own track or raceway containing balls, may be combined with a common component with the plain confronting surface. The track or raceway containing the balls is preferably a groove with a V-shaped or curvilinear profile. Such a groove preferably defines a ball contact angle of about 3° to 30°. The raceway effectively constitutes an interrupted single screw-thread with start and end regions spaced apart along the common axis of rotation to provide the lead. The shape of the groove creates a wedging effect with the balls to resist direct linear motion between the components. The groove can have a differential contact angle in relation to the lead. A coarse lead would generally have a smaller contact angle. The balls can be subjected to a radial pre-load to increase the tractive force. The groove may also have a symmetrical or asymmetrical profile, say to allow slippage or relative linear motion in one direction only.

Guide or camming means of various forms serves to transfer the balls from the end to the start of the raceway or groove. A channel or slot in combination with guide members can serve to guide the balls. The balls or other rolling elements of the set may contact one another thus to keystone the elements and prevent them falling out of the device during assembly or disassembly. This arrangement is particularly applicable where the groove or raceway has a fine lead. A cage can however be used to space the elements. Conveniently, however, end covers, detachable or non-detachable, protect the raceway and rolling elements. Such end covers also retain the rolling elements in the raceway.

In some applications additional outrigger bearings receive the shaft to hold the latter in the correct orientation with respect to the ring and resist tilting forces. Such outrigger bearings can be shaped to retain the rolling elements in the groove or raceway.

Normally the main components of the device would be made from metal but in certain applications synthetic plastics can be used.

The invention may be understood more readily, and various other aspects and features of the invention may become apparent, from consideration of the following description.

DESCRIPTION OF THE DRAWINGS

Embodiments of the invention will now be described, by way of examples only, with reference to the accompanying drawings, wherein:

FIG. 1 is perspective exploded view of a device constructed in accordance with the invention;

FIG. 2 is an end view of the device shown in FIG. 1 with one of the cover plates removed;

FIG. 3 is a part-sectional side elevation of the device shown in FIG. 1 with the cover plates removed;

FIG. 4 is a part-sectional and part-exploded side view of the outer component and cover plates of the device shown in FIG. 2;

FIG. 10a is an end view of a cover for use with a device constructed in accordance with the invention;

FIG. 10b is a sectional view taken along the line I—I of FIG. 10a;

FIG. 10c is a sectional view taken along the line II—II of FIG. 10a;

FIG. 11a is a front elevation of the guide piece of the cover shown in FIGS. 10a–10c;

FIG. 11b is a sectional view taken along the line III—III of FIG. 11a;

FIG. 11c is a side view of the guide piece shown in FIG. 11a;

FIG. 12b is an end view of the cover plate used in the device shown in FIG. 12a;

FIG. 13a is a schematic representation of part of the ball track of a device constructed in accordance with the invention;

FIG. 13b is a sectional view taken along the line V—V of FIG. 13a;

FIG. 15b is an end view of the device shown in FIG. 15a;

FIG. 17b depicts a strip used to form the outer component of the device shown in FIG. 17a;

FIG. 17d is a scrap-view of part of the device shown in FIG. 17a;

FIG. 18a is an end view of part of a further device constructed in accordance with the invention;

FIG. 18b is a sectional side view of the outer component of the device shown in FIG. 18a;

FIG. 18c is a sectional view taken along the line VI—VI of FIG. 18b;

FIG. 19a is a sectional side elevation of an outer component of a further device constructed in accordance with the invention in conjunction with an associated jig;

FIG. 19b is an end view of the component of FIG. 19a;

FIG. 19c is a side view of the component of FIG. 19b;

DESCRIPTION OF PREFERRED EMBODMENTS

Figure 5A:
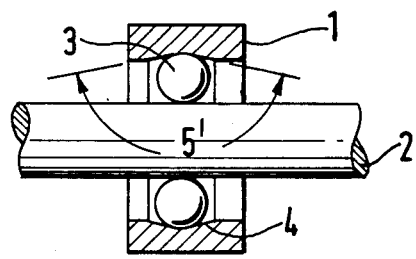
FIGS. 5a to 5d are views corresponding to FIG. 3 but depicting alternative shapes for the ball track.

As shown in FIGS. 1 to 4, a device constructed in accordance with the invention includes a first or outer component in the form of a ring 1 and a second or inner component in the form of a shaft, tube or spindle. The ring 1 and the shaft 2 mutually contact rolling elements in the form of balls 3. The ring 1 has a track or raceway 4 formed at its inner periphery to guide the balls 3 for progressive rolling motion. The ring 1 has recesses 8 in its side faces for receiving annular covere plates 6. The track 4 in this embodiment takes the form of a symmetrical part-helical V-shaped groove. The balls 3 contact the track 4 to permit direct relative rotation between the components 1, 2 while inhibiting direct axial or linear motion. The balls 3 are guided for continuous movement in succession around the longitudinal axis of the shaft 2. A trasverse slot 7 in the ring 1 and guide pieces 9 on the covers 6 collectively serve to guide the balls 3 from the end to the start of the track 4. The balls 3 make wedging contact with flanks or faces of the track 4 and the shaft 2 thereby to resist direct relative linear movement parallel to the longitudinal axis of the shaft 2. Rotary motion between the components 1,2 however causes such linear movement via the balls 3 and the track 4 so that the device can function to convert rotary motion into linear motion. During assembly of the device, the balls 3 can be placed in the track 4 and the covers 6 fitted. The shaft 2, which may have a lead chamfer at one end, can then be rotated to feed within the balls. Alternatively, the outer ring 1 with only one cover 6 fitted can be placed over the shaft 2 and the balls 3 fed into the track 4 through the slot 7. the other cover 6 is then fitted. The use of covers 6 is not essential for retaining the balls 3 and and the balls 3 can be retained in the track 4 in other ways, e.g. by a keystone effect or by using a cage.

Figure 5B:
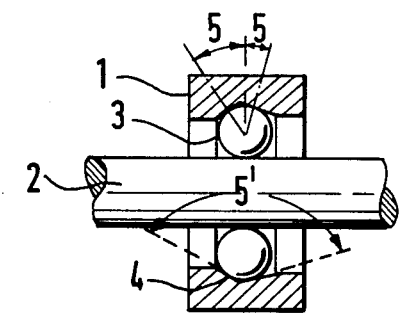
Figure 5C:
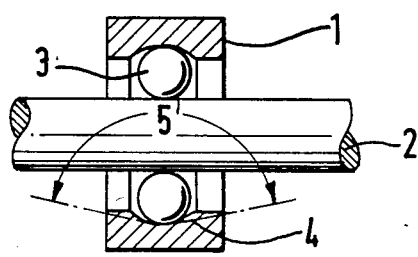
Figure 5D:
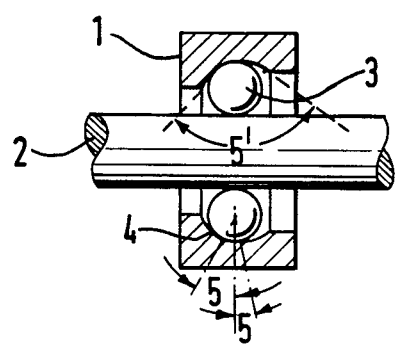

FIGS. 5a to 5d depict, by way of further examples, various shapes for the track 4. In these Figures the reference numeral 5 is used to denote the effective contact angles with respect to the balls 3 as defined by the track 4 or parts thereof. The reference numeral 5' denotes the total included angle of the track 4. FIGS. 5a and 5b illustrate, respectively, tracks 4 with symmetrical and asymmetrical profiles with flat faces while FIGS. 5c and 5d illustrate, respectively, tracks 4 with symmetrical and asymmetrical profiles with curvilinear faces. FIGS. 5b and 5d, which depict tracks 4 with asymmetrical profiles, and different contact angles 5, permit direct relative linear motion in one direction while inhibiting such motion in the opposite direction. FIGS. 5a and 5c, which show tracks 4 with symmetrical profiles and relatively small uniform contact angles 5, ensure high operative traction forces between the components 1, 2 and the balls 3. When there is no relative rotary motion betwen the components 1, 2, relative linear motion is inhibited in both directions. Rotary motion will, however, cause controlled linear motion but if this linear motion is resisted by a relatively high external force, slippage will occur without restricting the rotary motion and damaging the components.

FIGS. 6a to 6d depict various ways in which a device constructed in accordance with the invention can be employed to provide relative motion between the components 1, 2.

The components 1, 2 of the device which move relatively can take a variety of shapes and sizes. The inner component can be hollow and of any length and a single inner component may have a plurality of outer components mounted thereon.

The conversion of rotary motion to linear motion by the devices constructed in accordance with the invention is not the same as a screw and nut with mating threads. The latter move linearly in equal ratio to each other according to the pitch of the thread. Also the devices constructed in accordance with the invention operate in a different manner to a conventional ball-screw arrangement in which the recirculating balls make four point contact with the threads on the shaft and in the nut. Devices in accordance with the invention have only a partially threaded member in that the raceway groove or track 4 is of part helical form i.e. less than 360° angle of helix. Because the starting portion and end portion of the helical raceway groove 4 is interrupted the lead of the helix is not restricted by the width of the raceway groove as in the case of the ball-screw-and-nut arrangement. Furthermore, because of the epicyclic rotary relationship between the balls 3 and the driven component(s) 1, 2 of the device, the relative linear movement between the components 1, 2 is less than the lead of the helix. One revolution of the shaft 2 or one revolution of the outer ring 1, imparts the same linear movement to the component which is not constrained from axial movement and this axial movement is the pitch of the device. The principle of the conversion of rotary motion by devices in accordance with the invention can be explained as follows:

In general, but with reference to FIG. 2, the rotary movements of the shaft 2, the set of balls 3 and the outer ring 1 have an epicyclic relationship. The resultant linear movement of the outer ring 1 or the shaft 2 (termed the pitch) is dependent on the rotation of the set of balls 3 in the track 4. The magnitude of the pitch is not the same as the lead of the track 4 because of the epicyclic effects. The magnitude of the pitch or linear movement relative to the lead of the track 4 is dependent upon the rotation of the set of balls 3 in the track 4 such that $$P = T \times L \quad (1)$$

where: P = the pitch, T = number of revolutions of the set of balls 3 in the track 4 and L = the lead of the track or raceway 4.

Figure 6A:
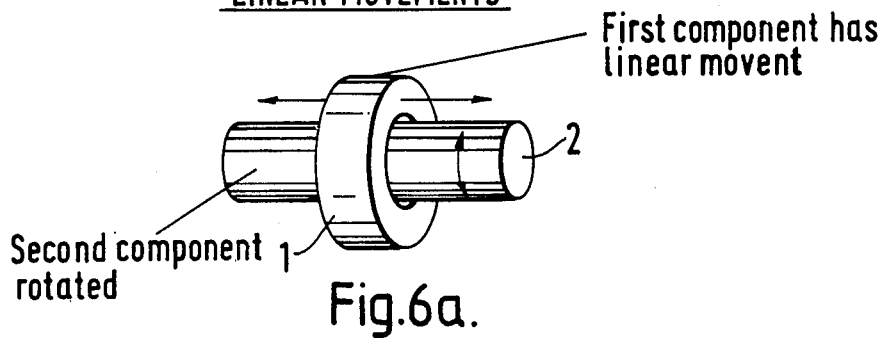
FIGS. 6a to 6d depict the various realtive movements which can occur between the components of a device constructed in accordance with the invention.

In the case of FIG. 6a where the shaft 2 is rotated and the outer ring 1 undergoes linear movement, the set of balls 3 are driven by the shaft 2 around the helical raceway or track 4. If the outer ring 1 is constrained from rotating, but free to move in an axial direction, the motion of the set of balls 3 moves the outer ring 1 along the shaft 2. Similarly, in FIG. 6c where the shaft 2 is rotated and moved linearly while the ring 1 is held stationary. In these cases, the partial rotation of the ball set from one revolution of the shaft can be calculated from the expression $$R_B = D/(D1 + D2) \quad (2)$$

where $R_B$ = the part-rotation or rotation of the ball set produced by one revolution of the shaft 2, D1 = the outer ring raceway diameter and D2 = the diameter of shaft 2. Thus, by way of example; if the diameter of the outer ring 1 is 2 units and the diameter of the shaft is 1 unit then as the shaft 2 rotates through one revolution the ball set moves through $2/(2+1) = \frac{2}{3}$ of a revolution. From Equation 1) this means that for one revolution of the shaft 2 the outer ring 1 moves in a linear direction by two-thirds of the lead of the helical raceway. Thus, if the lead is 0.015 then the pitch or linear movement of the outer ring 1 relative to the shaft 2 for one revolution of the shaft 2 is $\frac{2}{3} \times 0.015 = 0.01$.

Figure 6B:
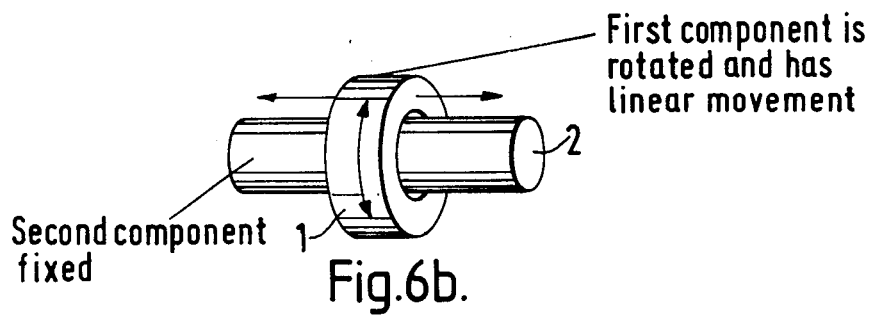
Figure 6C:
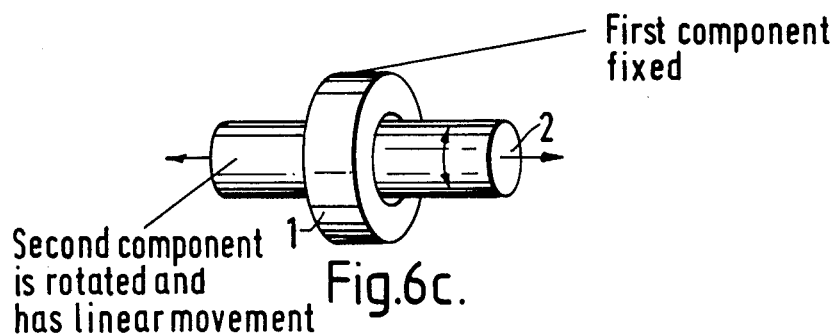
Figure 6D:
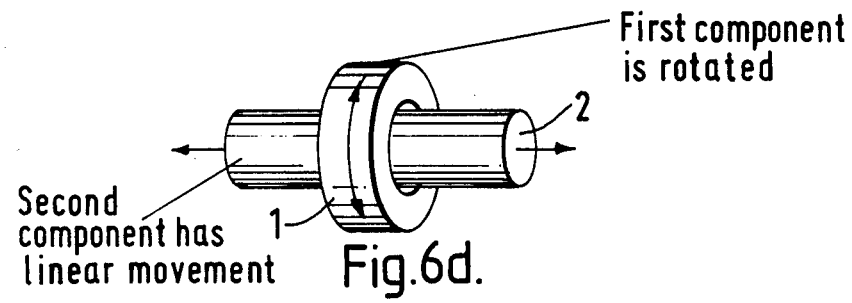

In the case of FIG. 6b where the outer ring 1 is rotated and moves linearly while, the shaft 2 is held stationary, as the ring 1 rotates any point on its helical raceway 4 advances relative to the constrained shaft 2. As the outer ring 1 rotates the ball set actually precesses in the opposite direction and this contrary movement of the ball set retards the advancement of the helical raceway 4. Consequently the net rotation that advances any point on the helical raceway 4 in a linear direction, and hence the ring 1, is the rotation of the outer ring 1 less the rotation of the ball set relative to the outer ring 1. Similar considerations apply to FIG. 6d. In these cases the net rotation of the outer ring 1 and the ball set which causes linear movement can be calculated from the following expression:

$$N_R = R_R - D2/D1 + D2) \quad (3)$$

where $N_R$ = net rotation of the ring 1 and of the ball set and $R_R$ = Revolutions of the outer ring 1. For one revolution of the outer ring the expression 3 becomes NR = 1 − D2/(D1+D2) and on further simplification NR = D1/(D1 = D2) which is the same as expression 2). Thus, for one revolution of the shaft 2 or outer ring 1, the linear movement LM of the outer ring 1 or shaft 2 can be calculated from:

$$L_M = D1/(D1+D2) \times L \quad (4)$$

It follows that the magnitude of linear movement for the shaft 2 or the outer ring 1 is the same regardless of which component is rotating and regardless of which component is constrained.

Figure 7:
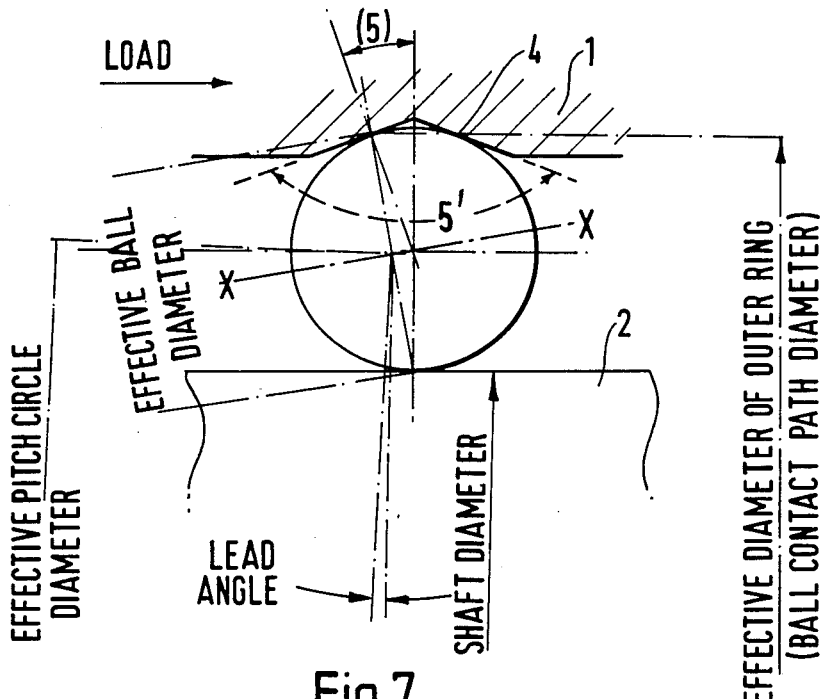
FIG. 7 is an enlarged schematic representation of part of a device constructed in accordance with the invention indentifying certain design parameters.

The parameter D1, i.e. the diameter of the outer ring raceway should actually take account of the contact angle 5 between the raceway 4 and the balls 3 and also the fact that under axial load the balls 3 will not necessarily rotate about an axis that is parallel to the shaft 2 and outer ring 1 axes. In FIG. 7 it is assumed that balls 3 rotate about axis 'X—X'. To determine the rotation of the ball set round the helical raceway 4 the following expression can be used:

$$R_B = PCD + DB/(2 \times PCD) \quad (5)$$

where PCD = the effective pitch circle diameter of the ball set and DB = the effective ball diameter.

Figure 8:
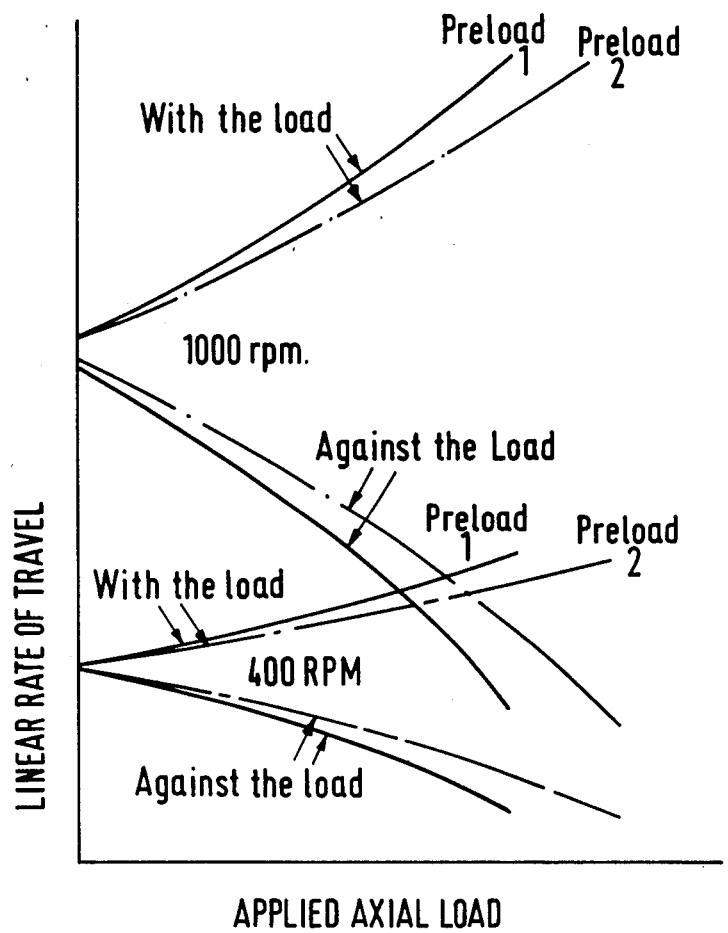
FIG. 8 is a graph depicting the relationship between the rate of linear motion between the components of a device constructed in accordance with the invention and the applied axial load at various rotational speeds.

In practice, the theoretical relationship between the epicyclic rotary motion and the linear pitch movement is modified by a series of interrelated complex parameters; typically (i) the magnitude and direction of the traction forces (ii) slippage within the loaded ellipical contact areas (iii) ball spin about axes in planes other than that of the shaft or outer ring rotary motion (iv) lubrication film thickness in the load zones and (v) temperature. However, practical tests have shown that for a given set of conditions, viz, internal geometry, radial preload, applied axial load, shaft or outer ring rotary speed and lubrication; the relationship between rotary and linear movement, relative to the direction of load, is constant and repeatable. Typical relationships are illustrated by the curves illustrated in FIG. 8. A characteristic of the relationships displayed in FIG. 8 is that a faster linear speed is provided with a device in which the load is active in the same direction. This is especially useful when the device is to be employed in a mechanism where a quicker response—such as a quick return—is desirable. Computer program models tha combine load distribution, and Hertzian contact stress theory with traction, spin and lubrication film theory, can predict for a given design the ratios of linear to rotary movement for the shaft or outer ring under applied load, speed and lubrication conditions. A device can thus be designed to give a specific performance within the practical limits of the helical raceway lead and the load/speed capabilities.

Figure 9:
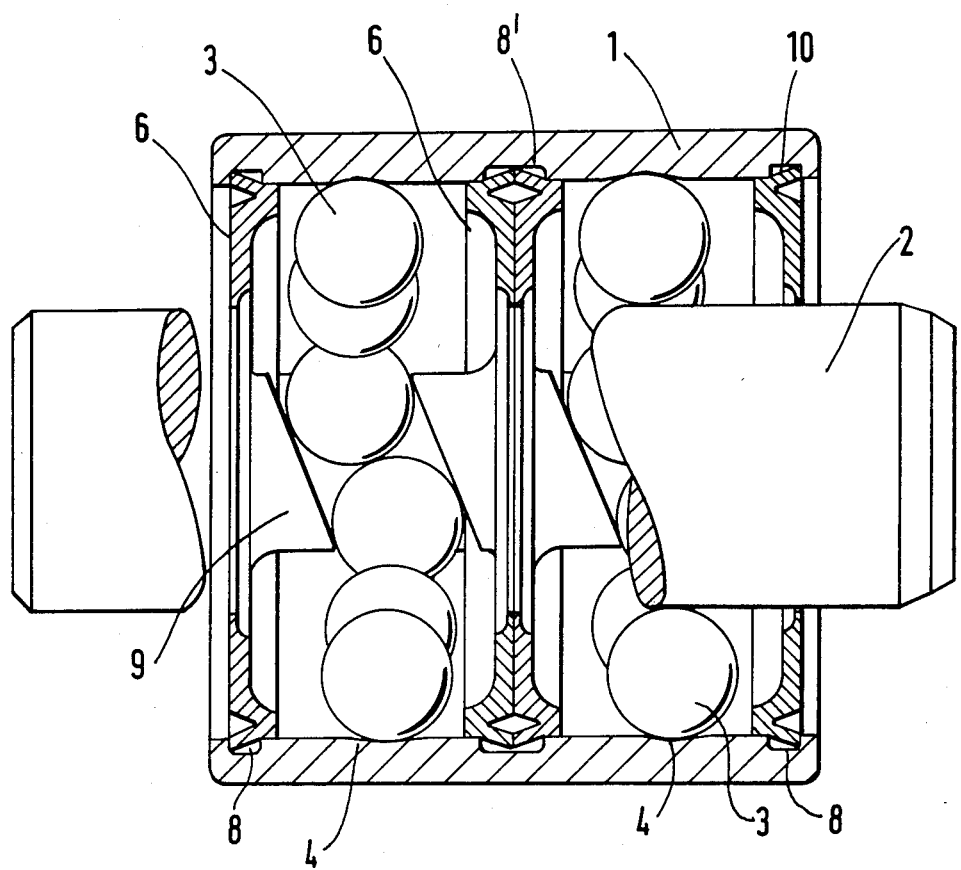
FIG. 9 is a part-sectional side elevation of another device constructed in accordance with the invention.

As mentioned previously, the inner component 2 may have several outer components 1 each with its own set of balls 3 guided in a track 4 mounted thereon. By this means the axial-load carrying capacity of the device can be increased since if one ring 1 can take a load of 25 kg then the load which can be taken by say, five rings 1 in tandem would be nominally 125 kg, subject to certain conditions. FIG. 9 depicts a device wherein a single outer ring 1 has two sets of balls 3 in the separate tracks 4. In this construction, four covers 6 are used. These covers 6 are flexible and resilient to deform inwardly for location purposes. A shaped peripheral flange 10 is provided for this purpose. Two of the covers 6 are disposed centrally of the ring 1 in abutting relationship in a common widened recess 8'.

FIGS. 10 and 11 depict a cover 6 and guide piece 9 suitable for use with devices constructed in accordance with the invention. The cover 6 can be made from synthetic plastics or metal, machined, cast, sintered or moulded. A recess 11 serves to receive the ball guide piece 9 provided with a ball-contacting working face 12 which can be flat or grooved. The guide piece 9 is best made from a wear resilient material such as bronze or hardended steel or plastics such as a phenolic resin; polyamide or PTFE. The covers 6 for a device may be identical since one cover 6 is merely inverted in relation to the other to arrange the faces 12 in parallel opposition. The guide piece 9 may be simply press-fitted in the recess 11 and a hole 13 in the cover 6 can permit a small rod to be used to remove the guide piece 9. The guide piece 9 can be inserted in the recess 11 either way way up to suit tracks 4 of opposite hand with the same lead and lead angles. The covers 6 may have location means in the form of pins 33 for engaging in recesses or depressions in the ring 1 or some structure associated therewith.

Figure 12A:
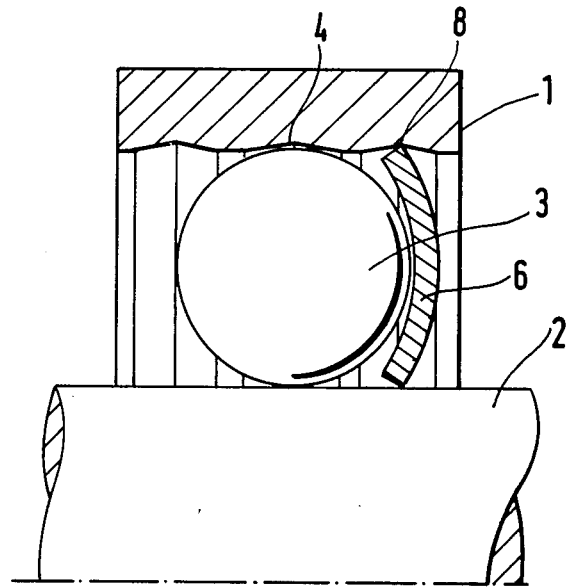
FIG. 12a is a part-sectional side elevation of part of a further device constructed in accordance with the invention.
Figure 12B:
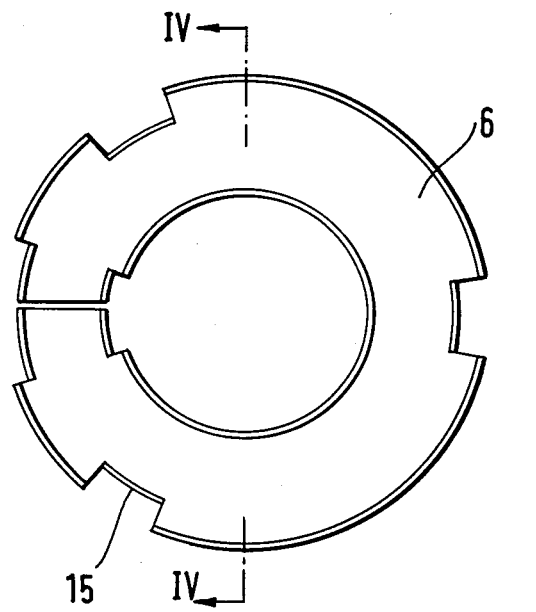
Figure 12C:
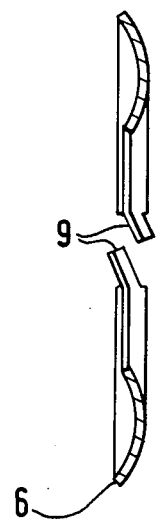
FIG. 12c is a sectional side view taken along the line IV—IV of FIG. 12b.

FIGS. 12a shows a device wherein the outer ring 1 has two helical V-shaped recesses 8 for receiving the end covers 6. These recesses 8 can have the same depth and lead as the track or raceway 4. The covers 6 are again resilient and conveniently made from spring steel, hardened and tempered steel strip, phosphor bronze or beryllium copper. The covers 6 can be split as shown in FIGS. 12b and 12c to deform and wind into the recesses 8. As shown in FIG. 12a, the covers 6 tend to locate around the balls 3 to retain the balls 3 in the track 4. Notches 15 are provided around the outer periphery of the cover 6 to enable a tool to fit the cover 6 to the ring 1 and adjust the cover 6 circumferentially. As shown in FIG. 12c integral lugs forming the guide pieces 9 are incorporated on the covers 6 and the width between the guide pieces 9 may be adjusted by rotating either or both covers 6 with the aid of the tool.

Figures 13A, 13B:
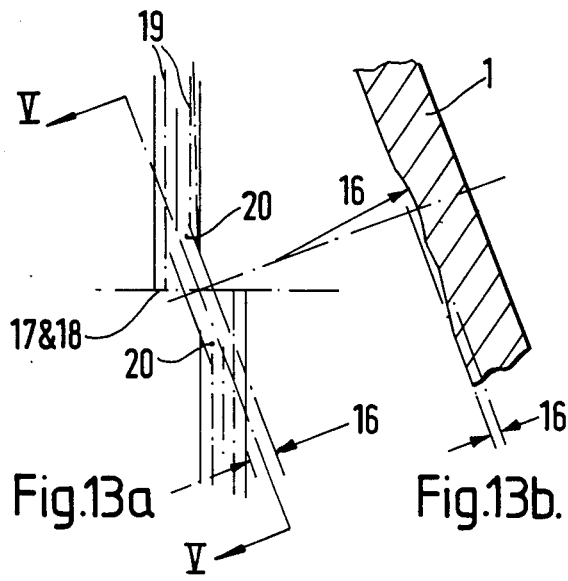

FIG. 13 depicts an additional or supplementary guide means for guiding the balls 3 between the start 17 and end 18 of the raceway or track 4 in the outer ring 1. This guide means takes the form of a machined channel 16 in the ring 1 directly connecting the regions 17, 18 of the track 4. The channel 16 relieves the contact path 19 of the opposite sides of the track 4 as at 20 to bring the balls 3 gradually out of and into the load zones at the end regions 17, 18 of the track 4.

Figure 14:
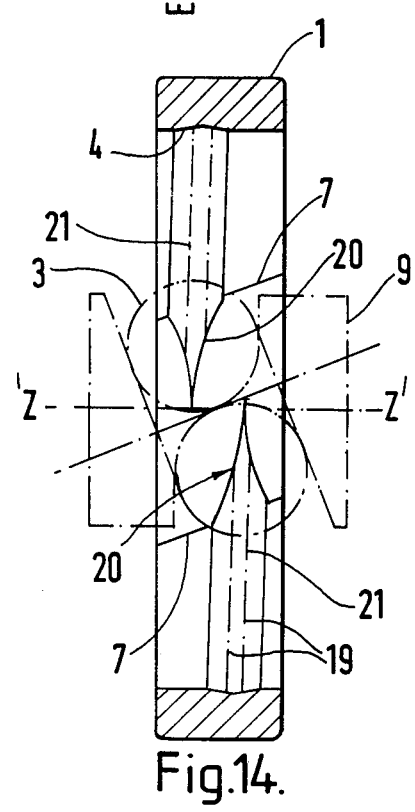
FIG. 14 is a sectional side elevation of an outer component of a further device constructed in accordance with the invention.

Another supplementary guide means is depicted in FIG. 14. In this construction, the transverse slot 7 is provided in the ring at an angle to the axis Z—Z. The intersection of the raceway 4 with the inclined slot 7 again relieves the ball contact path 19 on opposite sides of the track 4 as at 20. As the balls 3 progress around the track 4 they become intially loaded between the longer path 21, the guide pieces 9 (shown in dotted outline) and the next ball. This provides a gradual lift from the slot 7 into the raceway 4.

Figure 15A:
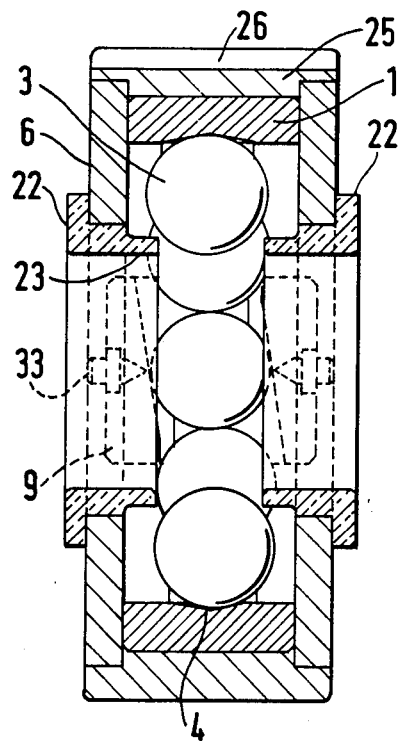
FIG. 15a is a part-sectional side elevation of a further device constructed in accordance with the invention.
Figure 15B:
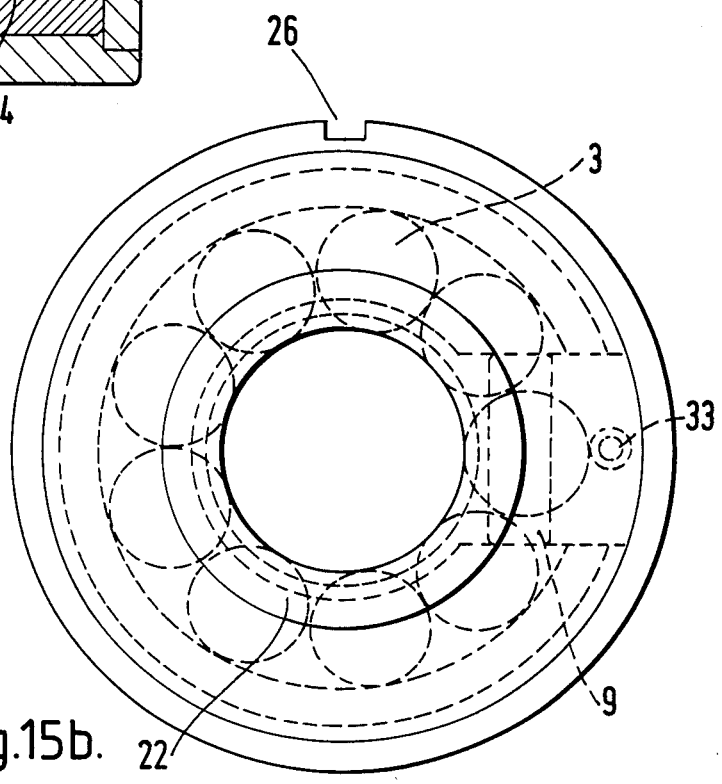
Figure 16:
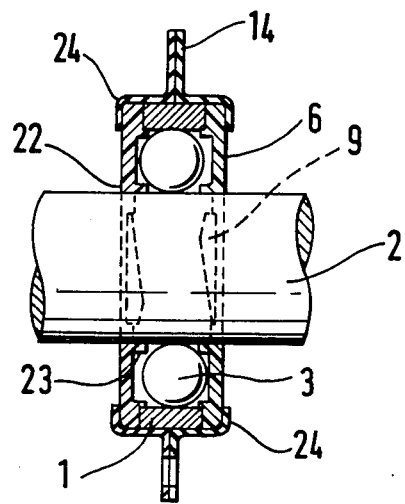
FIG. 16 is a part-sectional side elevation of a further device constructed in accordance with the invention.
Figure 17B:
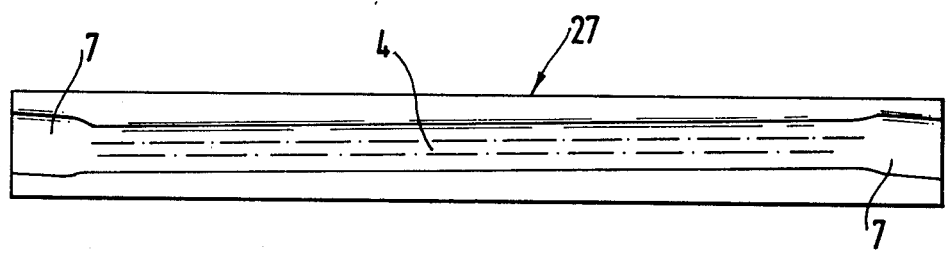
Figure 17C:
FIG. 17c is an end view of the strip of FIG. 17b.
Figure 17D:
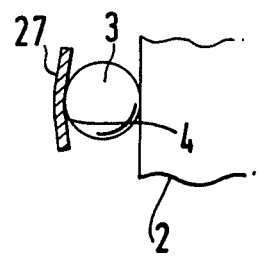
Figure 17A:
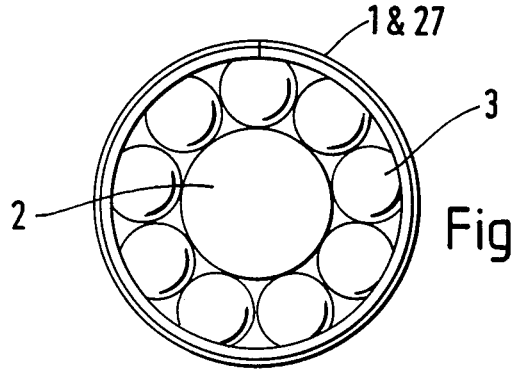
FIG. 17a is an end view of a further device constructed in accordance with the invention with the cover plate removed.

FIG. 15a depicts a device wherein the ring 1 seats on a pair of outrigger plain bearings 22 which receive the shaft 2 (not shown). These bearings 22 have opposed portions 23 which retain the balls 3 in the track 4. A housing 25 which may be a single or multi-part unit surrounds the ring 1 and, if necessary, encapsulates the structure. The covers 6 are fitted to the housing 25 to overlap the ring 1. The ring 1 has notches in its side faces which receive the pins 33 on the covers 6 to locate the latter. The device preferably has means 26 which permits the ring 4 to be locked against rotation or drivably rotated. Such means can take the form of a simple mounting flange or keyway or a gear or pulley provided on the housing 25 or otherwise. FIG. 15b shows, as an example, a simple notch serving as the aforesaid locking means 26. FIG. 6 depicts a device essentially as in FIG. 15 but employing a drawn cup 24 as a housing. In FIG. 16 the shaft 2 is also shown located within the ring 1. In this construction a flange 14 on the housing 24 serves to mount the device to a static or drivable member.

FIGS. 17a to 17d depict one way of fabricating the ring 1 particularly where an external housing (24, 25 as in FIGS. 15 and 16), is used. In this technique a metal strip 27 is treated by pressing or rolling to produce the raceway or track 4. The slot 7 is also pressed or rolled into the strip 27 at the end of the track 4. The strip 27 is then rolled into circular form and fitted into the associated housing 24, 25. The ends of the strip 27 can be joined together as by welding. Alternatively, the ends of the strip 27 can be angled-off and a small gap left between the ends when the strip 27 is shaped to form the ring 1. This gap can be designed to assist the transfer of the balls 3 from the end to the start of the track 4. FIGS. 18a to 18c depict a device which also uses a metal strip 27 as the ring 1. In this device the slot 7 and guide pieces 9 are provided by a supportive housing 28 as by moulding or machining. The strip 27 which is preferably resilient can be sprung into the housing 28 and located both axiially and radially thereby. The housing 28 could be of multi-part construction however so that the strip 27 can by hardened and then placed inside the parts of the housing 28. In such an arrangement, the housing parts can be united by ultrasonic welding, for example, to entrap the ring 1.

Another method of fabricating the ring 1 is shown in FIGS. 19a–19c. The ring 1 has a fracture 29 and to obtain a straight fracture the side faces of the ring 1 are initially provided with notches 32. The ring 1 is then placed into a jig 31 which serves to twist the ring 1 within its elastic limit to provide a helical form 30 with the desired lead to permit the creation of the track 4 thereafter by circumferential grinding. When the ring 1 is removed it reverts to its normal form to cause the track 4 to assume its helical shape.

In the embodiments wherein the ring 1 is surrounded by a support housing 24, 25, 28 such in as FIG. 16, it is possible to provide initial clearance between the ring 1 and the support housing to permit the ring 1 to expand radially in order to relieve excessive radial pre-load induced by extremes of manufacturing tolerances. Such clearance is however not essential.

Figure 20:
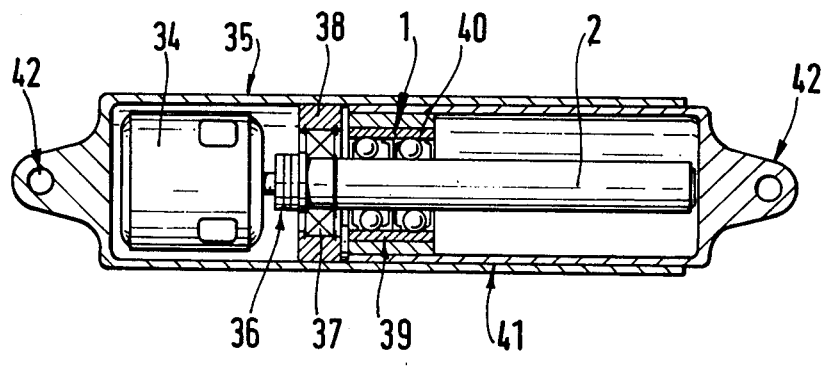
FIG. 20 is a part-sectional side elevation of a mechanism incorporating a device constructed in accordance with the invention.
Figure 21:
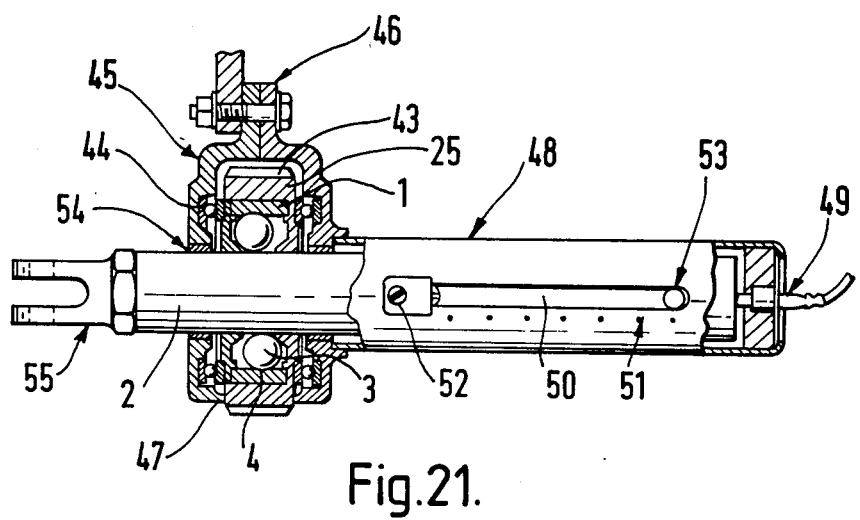
FIG. 21 is a part-sectional side elevation of another mechanism incorporating a device constructed in accordance with the invention.
Figure 22:
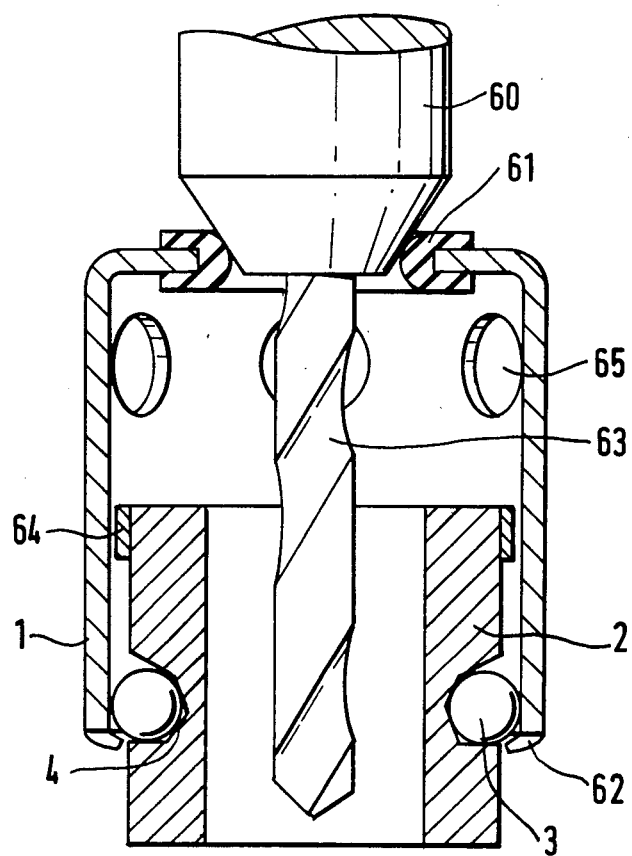
FIG. 22 is a part-sectional side elevation of a further device constructed in accordance with the invention in association with a rotary twist drill.

Devices constructed in accordance with the invention can be employed in a wide range of applications and mechanisms of which the following FIGS. 20 to 22 are merely exemplary. There is no limit on the fineness of the lead for the helical raceway 4 in the outer ring 1 and, as discussed previously, due to the epicyclic effect of the balls 3 on relative rotational movement between the components 1, 2 the linear pitch of the outer ring 1 or shaft 2 is finer than the lead of the helical raceway 4.

This means very low rates of linear movement are possible and it is quite practical to drive the shaft 2 or the outer ring 1 via a coupling, direct from a power source such as an electric motor. One simple arrangement would be to utilize an electric motor with a hollow drive shaft into which the shaft 2 of a device constructed in accordance with the invention is received. The outer ring component 1 could then be coupled to the motor armature so that the shaft 2 is moved linearly through the motor armature as the motor is energised.

FIG. 20 depicts a mechanism which can incorporate any of the devices e.g. single row, single rows mounted in tandem or a double row device. However, as illustrated, a double-row device designated 39 is employed. As shown, an electric motor 34 is mounted in a tubular housing 35 and drives the shaft 2 of the device 39 via a simple coupling 36. The shaft 2 is supported and located by a rolling bearing or plain flanged bush bearing 37 which may be received in an intermediate housing 38 fixed to the tubular housing 35. The ring 1 of the device 39 moves linearly along the shaft 2 as the shaft rotates. The device 39 is conveniently mounted in an intermediate support housing 40 fixed to a second tubular housing 41. The housing 41 is received in telescopic manner in the housing 35 and, e.g. keyed thereto, to lock the housing 35, 41 against relative rotation. Relative axial movement between the housings 35, 41 is thus permitted. The motor 34 operates to move the inner housing 41 in and out of the outer housing 35. At the ends of the housing 35, 41 there are coupling means 42, such as apertured lugs, which permit the mechanism to be connected, respectively, to some appliance(s) to be actuated by the mechanism and mounted to a fixed abutment or pivot joint.

FIG. 21 shows an actuator mechanism incorporating a device as described but driven by an external source. The outer ring 1 of the device is mounted in a support housing 25 having gear teeth 43 (spur, helical or worm) on its exterior. The assembly composed of the outer ring 1 and the housing 25 is mounted in an eccentric split housing 45. The ring and housing assembly 1, 25 is axially located by ball or needle thrust bearings, or thrust pads 44. Flanges or lugs 46 permit the housing 45 and hence the mechanism to be secured to the frame of a machine for example. An opening 47 in the housing 45 permits access to the gear teeth 43 and enables the ring 1 to be driven rotatably from the external source by an idler gear or directly. The shaft 2 extends through the housing 45 and extends within a tube 48 closed at one end remote from the device 1. Bearings 54 guide the shaft 2 for linear movement. The bearings 54 preferably also seal the interior of the housing 45 and can take the form of plain bushes or linear ball bushings. The tube 48 is fixed to one section of the housing 45 and carries a sensor 49 at its closed end for detecting the presence of the shaft 2. A longitudinal slot in the tube 48 receives a further sensor 52 which can be adjusted along the slot and clamped in a desired location according to the extent of intended linear travel of the shaft 2. Indicia 51 forming a scale are provided on the tube 48 alongside the slot. A pin 53 mounted to the shaft 2 serves to actuate the displaceable sensor 52 and prevents relative rotation between the shaft 2 and the tube 48. The sensors 49,52 would be connected to a suitable control circuit designed to reverse the direction of rotation of the ring 1. A coupling 55 is fitted to the end of the shaft 2 remote from the tube 48. This coupling 55 permits appliance(s) such as levers or the like to be actuated by the linear motion of the shaft 2. By setting the sensors 49, 52 the shaft 2 can be made to reciprocate by a predetermined stroke. A number of mechanisms of the type illustrated can be driven by one common motor or power source. A drive motor can conveniently drive the or each mechanism via a worm and worm wheel gear train. Gearing providing a reduction or increased speed ratios can also be incorporated. The sensors 49, 52 can be replaced by other forms of transducers to provide accurate motion and indexing to intermediate stations of the mechanism.

FIG. 22 depicts a device constructed in accordance with the invention and used to control the rate of feed of a twist drill 63 and limit the depth of hole cut thereby. In this device the track 4 is provided on an inner sleeve 2 while the outer component 1 is a plain tube. The outer tube 1 locates to the drill chuck 60 via a grommet 61 designed to impart rotation to the tube 1. The tube 1 has an inturned lip 62 at its opposite end to retain the sleeve 2. A ring 64 is provided on the exterior of the inner sleeve 2. This ring 64 performs various functions: It prevents swarf or foreign matter from entering the track 4; it maintains the relative orientation between the components 1,2 thereby acting as a guide and it acts as an end stop between the components 1, 2. During use, the sleeve is held stationary so that the rotating tube 1 and drill chuck 60 move linearly downwardly over the inner sleeve 2 by a predetermined amount. Holes 65 in the tube 1 allow swarf to escape.

We claim:

1. In a device comprising first and second components rotatable about a common axis, the components having confronting curvilinear surfaces one of which is substantially plain and continuous while the other of which is substantially plain continuous and undivided except for relief predominantly in the form of at least one shallow machined-in groove forming a raceway and rolling elements in the form of balls between the confronting surfaces of the components in mutual contact with the confronting surfaces and the raceway; the improvement comprising the raceway being of part-helical form with an end and a start defining a lead;

additional structure defining camming means;

guide means including said camming means, and further relief of the other confronting surface for transferring and guiding the balls from the end to the start of the raceway; the groove being shallow and regular defining a ball contact angle in the range 3° to 30° between a plane perpendicular to the common axis and the line of action of the forces transmitted at the points of contact between the raceway and the balls and the effective radial space between the confronting surfaces in contact with the balls being designed and constructed to be physically smaller than the diameter of the balls to directly and inherently impose radial pre-load throughout the circulation of the balls in the groove;

whereby direct relative linear motion between the components parallel to the common axis is resisted in at least one direction as the balls become further wedged in the raceway between the surfaces while relative combined rotary and linear movements can occur in a predetermined relationship defined by the lead of the part helix of the raceway with the balls rolling progressively along the raceway in response to rotary drive imparted to one of the components.

2. A device according to claim 1, wherein the groove has a V-shaped profile with flat defining faces.

3. A device according to claim 1, wherein the groove has a curvilinear profile.

4. A device according to claim 1, wherein the groove has a symmetrical transverse profile.

5. A device according to claim 1, wherein the groove has an asymmetrical transverse profile.

6. A device according to claim 1, further comprising means locating with the components to maintain coincidence between respective axes of the first and second components thereby to align the confronting surfaces relative to planes perpendicular and parallel to said axes.

7. A device according to claim 1, and further comprising at least one further groove in the other confronting surface forming a further independent raceway for another set of balls, each raceway being part of one turn of a helic, and guide means for guiding the balls from the end to the start of the associated raceway; wherein the sets of balls are spaced apart along the axis of relative rotation so as to serve additionally to maintain alignment between the confronting surfaces.

8. A device according to claim 1, and further comprising at least one further groove in the other confronting surfaces forming a further independent raceway for another set of balls.

9. A device according to claim 1, wherein the further relief is a slot in the other confronting surface.

10. A device according to claim 1, wherein the first component is a ring, the second component is a shaft extending through the ring, and end covers extend between the ring and the shaft and have shaped guide pieces constituting the camming means.

11. A device according to claim 1, wherein the camming means at least includes shaped guide pieces disposed in opposed relationship for lateral contact with the balls.

12. A device according to claim 11, wherein the first component is a ring and the second component is a shaft extending through the ring, annular covers extend between the shaft and the ring and the guide pieces are provided on the covers.

13. A device according to claim 12, wherein the covers are positionally adjustable to vary the width between at least the guide pieces.

14. A device comprising a first component in the form of a ring, a second component in the form of a shaft, said components being rotatable about a common axis, the components having confronting surfaces one of which is substantially plain while the other of which is provided with a groove forming a raceway of part-helical form with an end and a start defining a lead, rolling elements in the form of balls between the confronting surfaces of the components in mutual contact with the confronting surfaces and the raceway, guide means for guiding the balls from the end to the start of the raceway; and annular covers extending between the components providing means to assist in maintaining coincidence between respective axes of the first and second components to align the confronting surfaces relative to planes perpendicular and parallel to said axes; wherein: the guide means at least includes relief of the other confronting surface and shaped guide pieces on the covers in opposed relationship for making lateral contact with the balls, the groove is shallow and regular defining a ball contact angle in the range 3° to 30° between a plane perpendicular to the common axis and the line of action of the forces transmitted at the points of contact between the raceway and the balls and the effective radial space between the confronting surfaces in contact with the balls is smaller than the diameter of the balls to directly impose radial pre-load
throughout the circulation of the balls in the grooves whereby direct relative liner motion between the components parallel to the common axis is resisted in at least one direction as the balls become further wedged in the raceway between the surfaces while relative combined rotary and linear movements can occur in a predetermined relationship defined by the lead of the part helix of the raceway with the balls rolling progressively along the raceway in response to rotary drive imparted to one of the components.

15. A device according to claim 6, wherein the first component is a ring and the second component is a shaft extending through the ring and location means takes the form of outrigger bearings supporting the ring and receiving the shaft.

16. A device according to claim 10, and further comprising a housing, at least containing the ring.

17. A device according to claim 10, wherein the ring is fabricated from strip material.

18. A device according to claim 10, wherein the ring is fractured during its fabrication and the fractured ring is twisted into helical form by using a jig to permit the raceway to be formed therein circumferentially.

19. A device according to claim 1, further comprising a slot in said other confronting surface constituting said relief, and wherein the guide means further comprises guide pieces which contact the balls and assist in their transferrence via said slot.

20. A device according to claim 1, wherein said first and second components are each of one-piece unitary construction.

21. A device according to claim 1, further comprising cover means locating with the components to positively retain the balls in the raceway.

22. A device for converting rotary movement of one component into pre-determined linear movement of another component rotatable about a common axis with said one component while resisting axial movements of said one component; said device comprising a groove of V-shaped profile machined in a continuous curved surface of the other component which confronts a plain continuous curved surface of said one component, the groove forming a track or raceway of part helical form with an end and a start offset parallel to the common axis to define a lead, a relief slot in the surface of the other component extending from the end to the start of the raceway, a plurality of balls located in the raceway for progressive rolling movement along the raceway, additional structure defining camming means for contacting the balls and transferring the balls in succession through the slot from the end to the start of the raceway as the balls progress along the raceway in response to rotary movement of the one component to cause the linear movement of the other component with a pre-determined relationship to the lead of the part helix, wherein the diameter of each ball is slightly greater than the radial space between the plain continuous surface and the flanks of the groove in contact with the balls so as to cause each ball to wedge therewith under direct radial pre-load imposed inherently
throughout the circulation of the balls in the groove unless located in the relief slot; and wherein the contact angle between the groove and the balls is in the range of 3° to 30° between a plane perpendicular to the common axis and the line of action of the forces transmitted at the points of contact between the groove and the balls.

* * * * *